May 17, 1949.     R. C. WYSS     2,470,539
LOCK FOR IRRIGATION PIPE JOINTS
Filed March 5, 1947     2 Sheets-Sheet 1
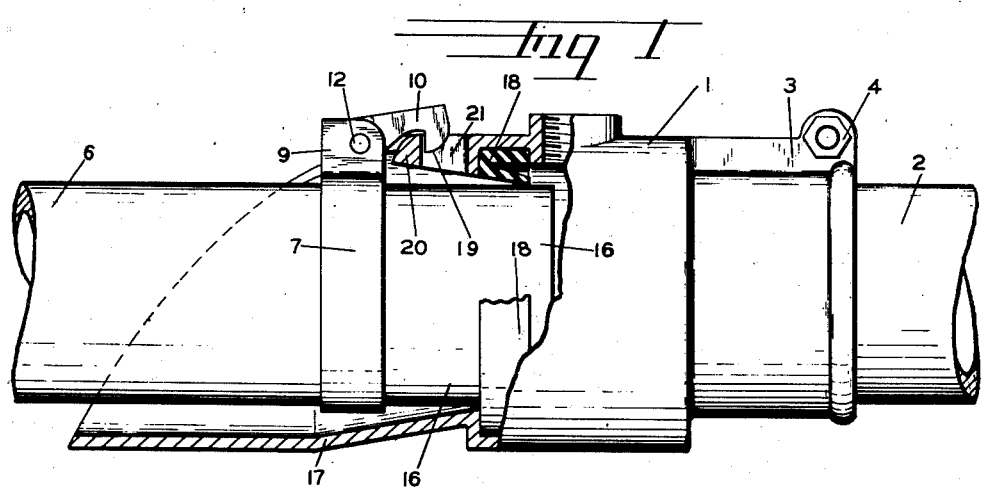
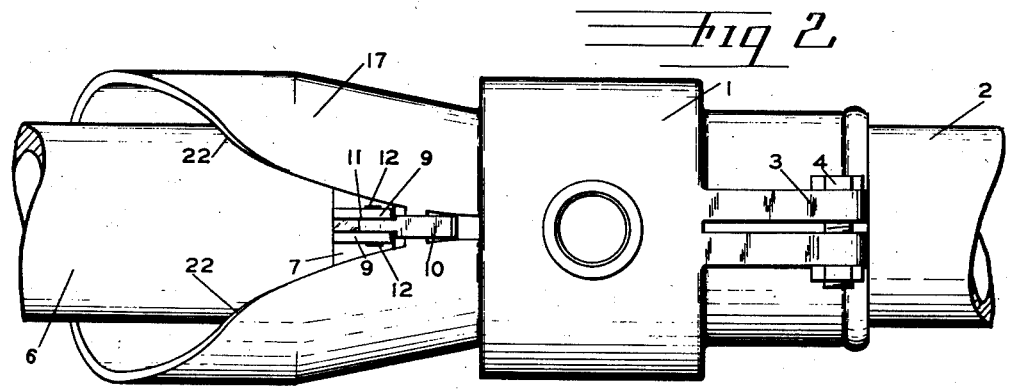
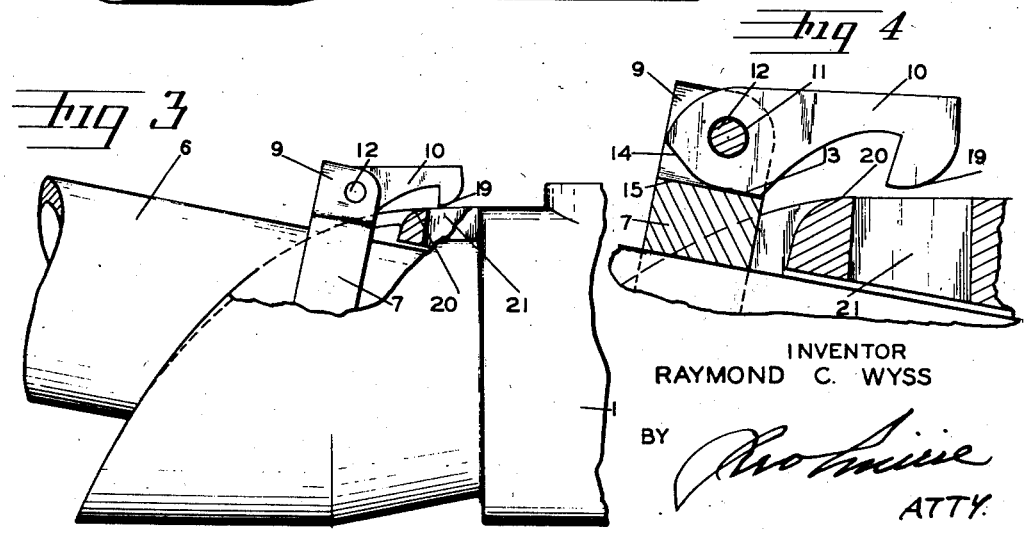
INVENTOR
RAYMOND C. WYSS

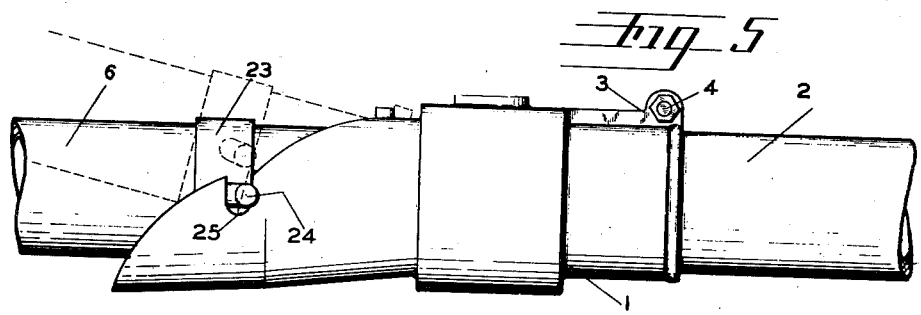
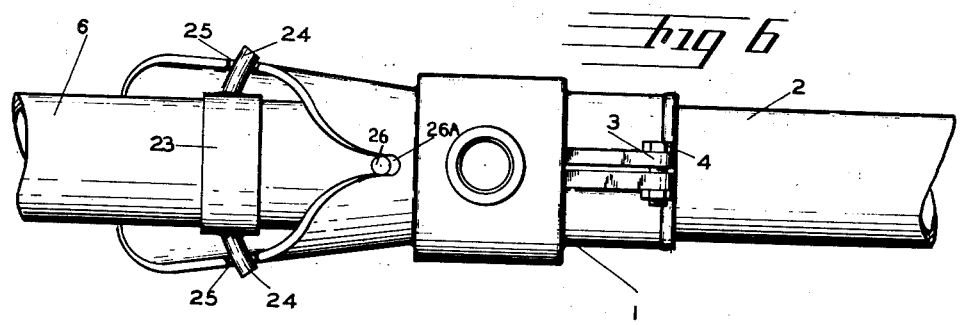
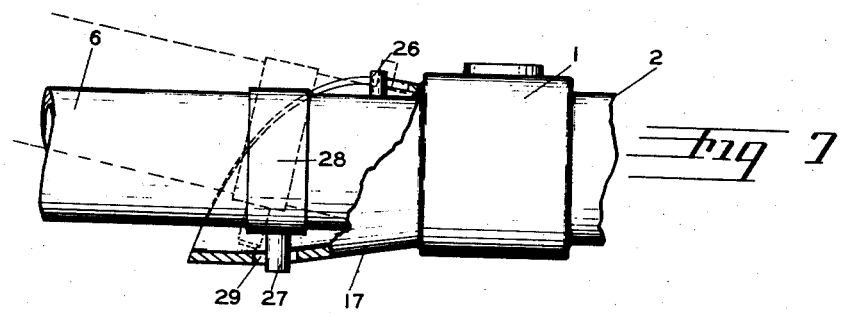
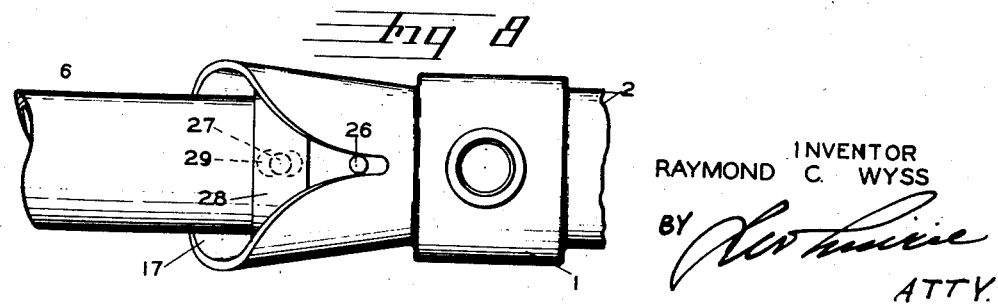

Patented May 17, 1949

2,470,539

UNITED STATES PATENT OFFICE 2,470,539

LOCK FOR IRRIGATION PIPE JOINTS

Raymond C. Wyss, Tillamook, Oreg.

Application March 5, 1947, Serial No. 732,593

2 Claims. (Cl. 285—170)

This invention relates to pipe couplings and is particularly adapted to be used in connection with irrigation piping.

The primary object of the invention is to provide a lock for pipe couplings that can be connected or disconnected by simply raising the outer end of one pipe relative to the other.

A further object of the invention is the provision of a locking mechanism that can be locked or unlocked without raising the pipe by simply manually disconnecting the locking latch.

These and other incidental objects will be apparent in the drawings, specification and claims.

Referring to the drawings:

Figure 1 is a side view of my new and improved locks for pipe coupling, parts of the coupling being broken away for convenience of illustration.

Figure 2 is a plan view of Figure 1.

Figure 3 is a fragmentary side view of the coupling illustrating how the lock is engaged or disengaged from the coupling by the raising of one pipe relative to another being coupled together.

Figure 4 is a fragmentary detail sectional view of the locking latch assembly.

Figure 5 is a side view of another preferred form of embodiment of locking the pipe within the coupling.

Figure 6 is a plan view of Figure 5.

Figure 7 is a fragmentary side view of another modified form of locking the pipe in place by the raising of the pipe, parts broken away for convenience of illustration.

Figure 8 is a plan view of Figure 7.

In the drawings:

The pipe coupling is indicated by numeral 1 fixedly secured to the pipe 2 referred to as the fixed pipe section by the clamp 3 and locking bolt 4. A water tight seal of any well known type seals the coupling and the pipe 2 to prevent leakage. The pipe 6 referred to as the movable pipe section is the one to be connected or disconnected from the coupling 1. Due to the thin wall of the pipe 6 a reenforcing band 7 is secured thereto by any suitable means and has ears 9 formed integral therewith, said ears extending upwardly to receive the locking latch 10, which is pivotally mounted to the ears at 11 by the pin 12.

Referring to Figure 4, it will be noted that the latch has a shoulder 13 preventing the same from lowering beyond a predetermined amount. The latch also has a shoulder 14 for engaging the surface 15 of the ears 9 limiting the amount that the latch can be raised.

I will now describe the operation of my new and improved locking latch. Referring to Figure 3 I will describe how the pipe 6 is removed from the coupling. The outer end of the pipe is raised as indicated. This raises the point 19 of the latch 10 above the cross bar 20 so that the end 16 of the pipe may be pulled away from the sealing ring 18 and out of the coupling without having to manually lift the latch 10 at the coupling. This may also be accomplished by raising the outer end of the pipe.

When the pipe 6 is to be connected to the coupling 1, the end 16 is inserted into the skirt 17 and forced on through the sealing ring 18, and as the lower part 19 of the latch 10 engages the cross bar 20 it will automatically raise and drop into the opening 21. I do not wish to be limited to a hinged latch 10 as in case the locking latch were made rigid with the pipe the outer end of said pipe would have to be raised in order to insert and lock the same within the coupling.

I have found that in places where the outer end of the pipe cannot be raised that the pivotally mounted latch is an advantage. In the assembling of the pipe line the end of the pipe 6 is inserted in the skirt 17 of the coupler 1 entering the seal 18. The risers, not shown, on the pipe line are maintained in a vertical position by the end 19 of the latch engaging the opening 21 of the skirt, also in the operation of insertion of the pipe the latch 10 and the ears 9 guide the same into the coupling by contacting the edge 22 of the skirt.

In Figures 5 and 6 I show another preferred form of lock. Extending outwardly and horizontally from the pipe 6 on the ring 23 are locking horns 24. As the pipe is raised on insertion, as shown by the broken line position Figure 5, these horns pass over the latch 25 and on the lowering of the pipe the horns will drop down into the notches preventing the pipe from being removed therefrom. A vertical pin 26 engages the notch 26A and aligns the pipe maintaining the risers in a vertical position.

Another preferred form of lock is illustrated in Figures 7 and 8, wherein an upwardly extending pin or guide 26 guides the pipe 6 into the coupling 1 while in raised position, indicated by the broken lines, at the same time the pin 27 secured to the ring 28 registers with the hole 29 located in the skirt 17 and on the lowering of the pipe the pin 27 enters the hole 29 preventing the longitudinal movement of the pipe 6 relative to the coupling 1.

I do not wish to be limited to the exact mechanical construction as shown, as other mechanical equivalents may be substituted still coming within the scope of my claims.

I claim:

1. A means for connecting pipe sections comprising a coupling formed with a collar to engage a pipe section, a flaring skirt open at the front and top and extending outwardly from the collar to permit introduction at an incline of an abutting pipe section when connecting pipe sections together, the collar having an annular interior groove adjacent the inner end of the skirt, a packing in the groove, the skirt in rear of the open portion having an opening for a lock when pipe sections are coupled together.

2. A pipe coupling comprising a collar split at its rear end, aligned lugs extending from the split portions, a bolt connecting the lugs, an elongated flaring skirt extending from the forward end of the collar, substantially semi-circular in cross section and open at the front and top, a groove formed in the interior of the collar between the rear of the skirt and the split portion, a packing in the groove, and an opening formed in the skirt adjacent the collar to receive a locking element.

RAYMOND C. WYSS.

REFERENCES CITED

The following references are of record in the file of this patent:

UNITED STATES PATENTS

| Number | Name | Date |
|---|---|---|
| 1,783,015 | Roos | Feb. 17, 1931 |
| 2,219,162 | Jacobs | Oct. 22, 1940 |
| 2,253,232 | Gheen | Aug. 19, 1941 |